US012662117B2

(12) United States Patent
Uemura et al.

(10) Patent No.:  US 12,662,117 B2
(45) Date of Patent:  Jun. 23, 2026

(54) VEHICLE CONTROL DEVICE

(71) Applicant: Hitachi Astemo, Ltd., Hitachinaka (JP)

(72) Inventors: Koichi Uemura, Tokyo (JP); Taku Takahama, Tokyo (JP)

(73) Assignee: Hitachi Astemo, Ltd., Ibaraki (JP)

( * ) Notice: Subject to any disclaimer, the term of this patent is extended or adjusted under 35 U.S.C. 154(b) by 36 days.

(21) Appl. No.: 18/834,651

(22) PCT Filed: Jul. 28, 2022

(86) PCT No.: PCT/JP2022/029187
§ 371 (c)(1),
(2) Date: Jul. 31, 2024

(87) PCT Pub. No.: WO2023/157337
PCT Pub. Date: Aug. 24, 2023

(65) Prior Publication Data
US 2025/0136107 A1     May 1, 2025

(30) Foreign Application Priority Data

Feb. 15, 2022    (JP) ................................. 2022-021400

(51) Int. Cl.
B60W 30/12        (2020.01)
B60W 50/10        (2012.01)
B62D 6/00         (2006.01)

(52) U.S. Cl.
CPC ............ B60W 30/12 (2013.01); B60W 50/10 (2013.01); B62D 6/00 (2013.01)

(58) Field of Classification Search
CPC .... B60W 30/12; B60W 50/10; B60W 50/082; B60W 2510/202; B62D 6/00;
(Continued)

(56) References Cited

U.S. PATENT DOCUMENTS 6,116,372 A * 9/2000 Mukai .................. B62D 5/0463
180/443
6,152,255 A * 11/2000 Noro ...................... B62D 6/007
180/443
(Continued)

FOREIGN PATENT DOCUMENTS

CN        106394668 A * 2/2017 ............. B62D 6/007
CN        115783039 B * 7/2025
(Continued)

OTHER PUBLICATIONS

JP2016159781A machine translation (Year: 2016).*
(Continued)

*Primary Examiner* — Angelina M Shudy
(74) *Attorney, Agent, or Firm* — Volpe Koenig

(57)        ABSTRACT

A vehicle control device that achieves preferred steering control characteristics of a driver while keeping lane tracing during lane keeping control. Included are: a lane shape detection unit that detects a lane shape around a vehicle; a steering torque detection unit that detects a steering torque of a driver who drives the vehicle; a lane keeping control unit that calculates a steering command for keeping within a lane based on the detected lane shape; and a steering control unit that controls vehicle steering based on the steering command from the lane keeping control unit, and the lane keeping control unit having a plurality of control characteristics including at least a first control characteristic and a second control characteristic selectable according to a preference of the driver, and selects the first or second control characteristic on the basis of switching information input in advance according to the preference of the driver.

8 Claims, 7 Drawing Sheets

(58) Field of Classification Search

CPC ........ B62D 6/007; B62D 15/025; G05D 1/00;
G08G 1/00; G01C 21/00

See application file for complete search history.

(56) References Cited

U.S. PATENT DOCUMENTS

| | | | | |
|---|---|---|---|---|
| 6,816,765 | B2 * | 11/2004 | Yamamoto | B62D 5/0457 |
| | | | | 180/407 |
| 8,965,633 | B2 * | 2/2015 | Lee | B62D 1/286 |
| | | | | 701/44 |
| 11,814,122 | B2 * | 11/2023 | Kim | B62D 5/0463 |
| 12,208,834 | B2 * | 1/2025 | Krone | B62D 15/025 |
| 12,269,470 | B2 * | 4/2025 | Fukuchi | B62D 15/0265 |
| 12,397,640 | B2 * | 8/2025 | Min | B60K 35/00 |
| 12,428,053 | B2 * | 9/2025 | Kobayashi | B62D 6/008 |
| 12,448,045 | B2 * | 10/2025 | Handa | B62D 5/0421 |
| 12,491,935 | B2 * | 12/2025 | Okazaki | B62D 6/001 |
| 2002/0107621 | A1 * | 8/2002 | Byers | B62D 6/008 |
| | | | | 180/443 |
| 2003/0078712 | A1 * | 4/2003 | Shimakage | B62D 1/286 |
| | | | | 701/41 |
| 2003/0106736 | A1 * | 6/2003 | Kogiso | B62D 5/0463 |
| | | | | 180/446 |
| 2005/0140322 | A1 * | 6/2005 | Itakura | B60W 40/09 |
| | | | | 318/466 |
| 2007/0233343 | A1 * | 10/2007 | Saito | B62D 1/28 |
| | | | | 701/41 |
| 2007/0250234 | A1 * | 10/2007 | Ito | B62D 5/0463 |
| | | | | 701/1 |
| 2008/0047775 | A1 * | 2/2008 | Yamazaki | B62D 6/008 |
| | | | | 180/443 |
| 2009/0024279 | A1 * | 1/2009 | Takeda | B62D 6/008 |
| | | | | 701/41 |
| 2011/0118936 | A1 * | 5/2011 | Hong | B60W 30/12 |
| | | | | 701/41 |
| 2011/0251758 | A1 * | 10/2011 | Kataoka | B62D 15/025 |
| | | | | 701/41 |
| 2014/0257628 | A1 * | 9/2014 | Lee | B62D 15/025 |
| | | | | 701/34.4 |
| 2015/0088383 | A1 * | 3/2015 | Kodato | B62D 5/0463 |
| | | | | 701/41 |
| 2015/0094915 | A1 * | 4/2015 | Oyama | B60W 30/12 |
| | | | | 701/42 |
| 2015/0225017 | A1 * | 8/2015 | Takeda | B62D 6/008 |
| | | | | 701/41 |
| 2015/0291163 | A1 * | 10/2015 | Kim | B60W 30/16 |
| | | | | 701/96 |
| 2015/0375777 | A1 * | 12/2015 | Endo | B62D 5/0463 |
| | | | | 701/41 |
| 2016/0244056 | A1 * | 8/2016 | Seguchi | B60W 30/12 |
| 2016/0355212 | A1 * | 12/2016 | Takaso | B62D 1/28 |
| 2017/0029025 | A1 * | 2/2017 | Kim | B62D 15/025 |
| 2017/0158227 | A1 * | 6/2017 | Katzourakis | B62D 6/008 |
| 2017/0329330 | A1 * | 11/2017 | Hatano | B60W 60/0051 |
| 2017/0334454 | A1 * | 11/2017 | Abe | B60W 50/0098 |

| | | | | |
|---|---|---|---|---|
| 2018/0009437 | A1 * | 1/2018 | Ooba | B60W 30/10 |
| 2018/0141588 | A1 * | 5/2018 | Shimizu | B62D 15/0265 |
| 2018/0170431 | A1 * | 6/2018 | Shirozono | B62D 15/025 |
| 2018/0201307 | A1 * | 7/2018 | Kudo | B62D 15/02 |
| 2018/0326990 | A1 * | 11/2018 | Kusaka | B60W 30/09 |
| 2019/0002020 | A1 * | 1/2019 | Yoo | G01L 5/221 |
| 2019/0009794 | A1 * | 1/2019 | Toyoda | G06N 3/09 |
| 2019/0101916 | A1 * | 4/2019 | Sen | B60W 60/0055 |
| 2019/0286127 | A1 * | 9/2019 | Watanabe | B62D 1/286 |
| 2019/0315394 | A1 * | 10/2019 | Lehmann | A01B 69/007 |
| 2020/0039511 | A1 * | 2/2020 | Ohmura | B60W 40/105 |
| 2020/0255007 | A1 * | 8/2020 | Tsuji | B60W 50/16 |
| 2020/0307594 | A1 * | 10/2020 | Kato | B60W 60/0059 |
| 2020/0307595 | A1 * | 10/2020 | Kato | B60W 10/30 |
| 2020/0361526 | A1 * | 11/2020 | Stoltze | B62D 15/025 |
| 2020/0377148 | A1 * | 12/2020 | Nakade | B62D 15/025 |
| 2021/0146956 | A1 * | 5/2021 | Fujita | B60W 60/0015 |
| 2021/0269089 | A1 * | 9/2021 | Kuenzner | B62D 6/08 |
| 2022/0063714 | A1 * | 3/2022 | Graus | B62D 5/0481 |
| 2022/0063717 | A1 * | 3/2022 | Kobayashi | B62D 5/0463 |
| 2022/0073135 | A1 * | 3/2022 | Kim | B62D 15/025 |
| 2022/0227412 | A1 * | 7/2022 | Akatsuka | B62D 5/0469 |
| 2023/0227093 | A1 * | 7/2023 | Takahata | G01V 3/088 |
| | | | | 324/672 |
| 2023/0303078 | A1 * | 9/2023 | Kato | B60W 40/08 |
| 2023/0311862 | A1 * | 10/2023 | Fukuchi | B62D 6/002 |
| | | | | 701/41 |
| 2023/0311935 | A1 * | 10/2023 | Yoshida | B60W 50/0205 |
| | | | | 701/23 |
| 2023/0347887 | A1 * | 11/2023 | Favreau | B60W 40/09 |
| 2023/0347919 | A1 * | 11/2023 | Ahumada | B60W 60/001 |
| 2023/0415811 | A1 * | 12/2023 | Okazaki | B62D 6/001 |
| 2024/0253695 | A1 * | 8/2024 | Handa | B62D 5/0421 |
| 2024/0326854 | A1 * | 10/2024 | Nishiguchi | B60W 50/14 |
| 2025/0058829 | A1 * | 2/2025 | Harish | B62D 15/0215 |
| 2025/0100615 | A1 * | 3/2025 | Kaufmann | B62D 5/091 |
| 2025/0128760 | A1 * | 4/2025 | Das | B60W 60/001 |
| 2025/0155325 | A1 * | 5/2025 | Flegel | G06F 30/17 |
| 2025/0171013 | A1 * | 5/2025 | Tsuda | B60W 10/04 |
| 2025/0196876 | A1 * | 6/2025 | Yokoyama | B60W 50/10 |
| 2025/0304044 | A1 * | 10/2025 | Oniwa | B60W 30/12 |
| 2025/0313259 | A1 * | 10/2025 | Wong | B62D 5/006 |

FOREIGN PATENT DOCUMENTS

| | | | | | |
|---|---|---|---|---|---|
| JP | | 2016159781 | A | * | 9/2016 |
| JP | | 2020023222 | A | * | 2/2020 ............... B62D 6/08 |
| WO | WO-2025120892 | A1 | * | 6/2025 ............... B62D 5/04 |

OTHER PUBLICATIONS

CN-115783039-B machine translation (Year: 2023).*
WO-2025120892-A1 machine translation (Year: 2025).*
CN-106394668-A machine translation (Year: 2017).*
JP-2020023222-A machine translation (Year: 2020).*
International Search Report, PCT/JP2022/029187, Aug. 30, 2022, 2 pgs.

* cited by examiner

*FIG. 1*

STEERING GAIN 1.0

SECOND CONTROL CHARACTERISTIC: STRONG CONTROL MODE

FIRST CONTROL CHARACTERISTIC: WEAK CONTROL MODE

TORQUE SENSOR ABSOLUTE VALUE

0

STEERING GAIN 1.0

SECOND CONTROL CHARACTERISTIC: STRONG CONTROL MODE g2

FIRST CONTROL CHARACTERISTIC: WEAK CONTROL MODE g1

TORQUE SENSOR ABSOLUTE VALUE

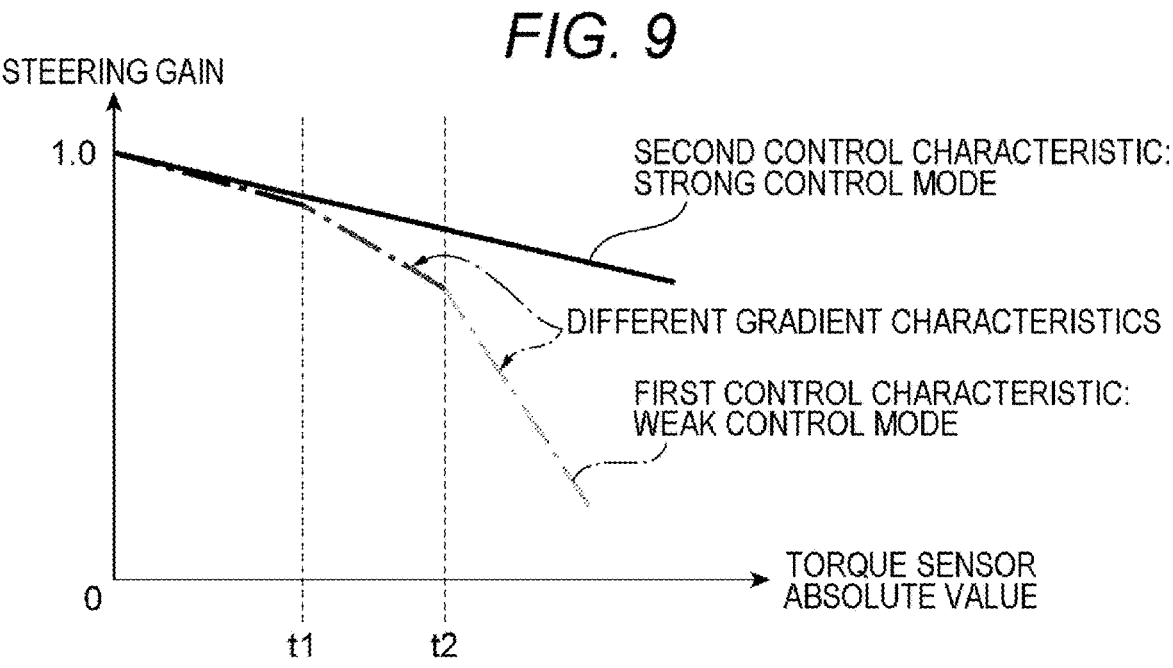

STEERING GAIN 1.0

SECOND CONTROL CHARACTERISTIC:
STRONG CONTROL MODE

DIFFERENT GRADIENT CHARACTERISTICS

FIRST CONTROL CHARACTERISTIC:
WEAK CONTROL MODE 0     t1     t2

TORQUE SENSOR
ABSOLUTE VALUE

FIG. 10

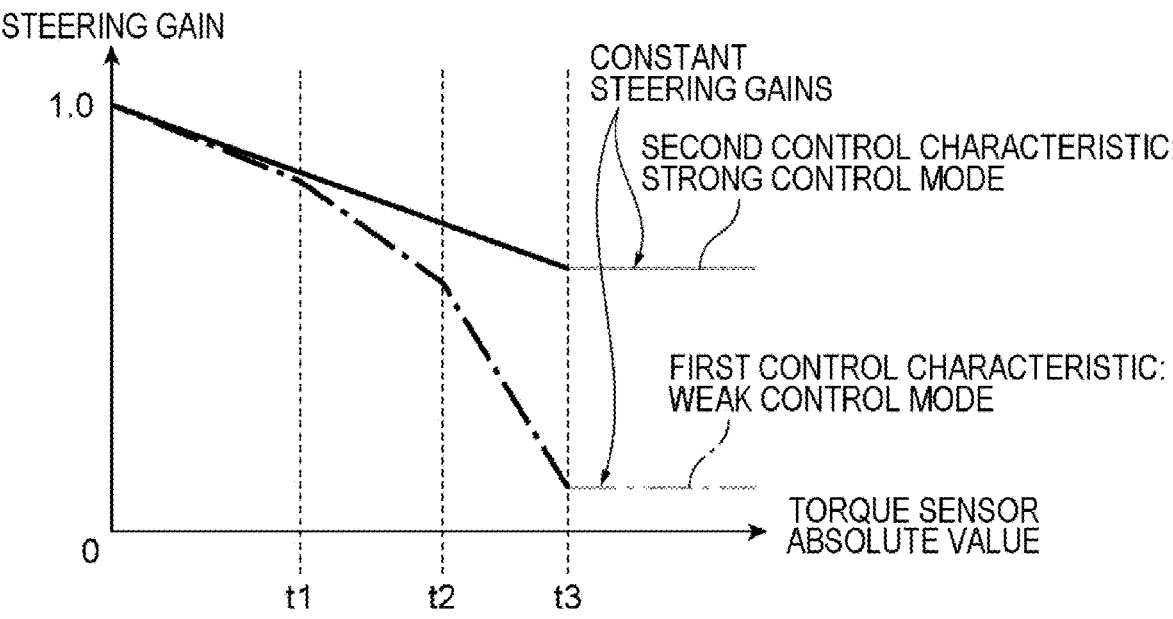

STEERING GAIN 1.0

CONSTANT
STEERING GAINS

SECOND CONTROL CHARACTERISTIC:
STRONG CONTROL MODE

FIRST CONTROL CHARACTERISTIC:
WEAK CONTROL MODE 0     t1     t2     t3

TORQUE SENSOR
ABSOLUTE VALUE

VEHICLE CONTROL DEVICE

TECHNICAL FIELD

The present invention relates to a vehicle control device that executes driving assistance.

BACKGROUND ART

Lane keeping (hereinafter, LK) control is a convenient function of reducing the driving load of a driver by keeping a host vehicle at the center of a traveling lane by steering control.

There are two modes of a steering wheel operation state of the driver during the lane keeping control, that is, "a state where the driver operates the steering wheel with intent" and "a state where the driver relies on a system function and does not actively operate the steering wheel", and which mode is selected depends on the driving style of the driver. Therefore, for the LK control, steering control that does not cause the sense of discomfort is required in each state.

PTL 1 discloses a vehicle control device that smoothly and appropriately switches a driving state in override determination in automatic driving during the LK control. PTL 1 discloses that "an override determination unit 11 of a travel control device 10 determines which override condition is established involving two stage operation modes, a first operation mode for performing cooperative control between an automatic operation and a manual operation, or a second operation mode for allowing the manual operation while stopping the automatic operation. Then, an operation mode switching unit 12 switches the operation mode depending on the stage of override to enable smooth and adequate switching of the operational states."

CITATION LIST

Patent Literature

PTL 1: JP 2016-159781 A

SUMMARY OF INVENTION

Technical Problem

However, in the vehicle control device described in PTL 1, (1) the control mode becomes discontinuous in the vicinity of the determination threshold of the override, and thus there has been a possibility of leading to the sense of discomfort. In addition, (2) the purpose of the cooperative control is to eliminate the sense of discomfort, but there is a problem that a preferred control amount of the driver cannot be selected, and thus the sense of discomfort of the cooperative control cannot be eliminated.

The present invention has been made in view of the above problems, and an object of the present invention is to provide a vehicle control device that achieves a preferred steering control characteristic of a driver while keeping lane tracing during LK control.

Solution to Problem

In order to solve the above problem, one of representative vehicle control devices of the present invention includes: a lane shape detection unit that detects a lane shape around a vehicle; a steering torque detection unit that detects a steering torque of a driver who drives the vehicle; a lane keeping control unit that calculates a steering command for keeping traveling in a lane on the basis of the detected lane shape; and a steering control unit that controls steering of the vehicle on the basis of the steering command from the lane keeping control unit, and the lane keeping control unit has a plurality of control characteristics including at least a first control characteristic and a second control characteristic selectable according to a preference of the driver, selects the first or second control characteristic on the basis of switching information input in advance according to the preference of the driver, calculates a steering control amount necessary for keeping traveling in the lane, and calculates the steering command after correcting the calculated steering control amount on the basis of the selected control characteristic.

Advantageous Effects of Invention

According to the present invention, it is possible to provide a vehicle control device that achieves a preferred steering control characteristic of a driver while keeping lane tracing during LK control.

Problems, configurations, and effects other than those described above will be clarified by the following description of embodiments.

BRIEF DESCRIPTION OF DRAWINGS

FIG. 1 is a block diagram of a vehicle control device according to a first embodiment of the present invention.

FIG. 9 is a steering gain map illustrating a steering gain according to a third embodiment of the present invention.

FIG. 10 is a steering gain map illustrating a steering gain according to a fourth embodiment of the present invention.

DESCRIPTION OF EMBODIMENTS

Hereinafter, embodiments of a vehicle control device of the present invention will be described with reference to the drawings.

First Embodiment (Configuration of Vehicle Control Device)

Figure 1:
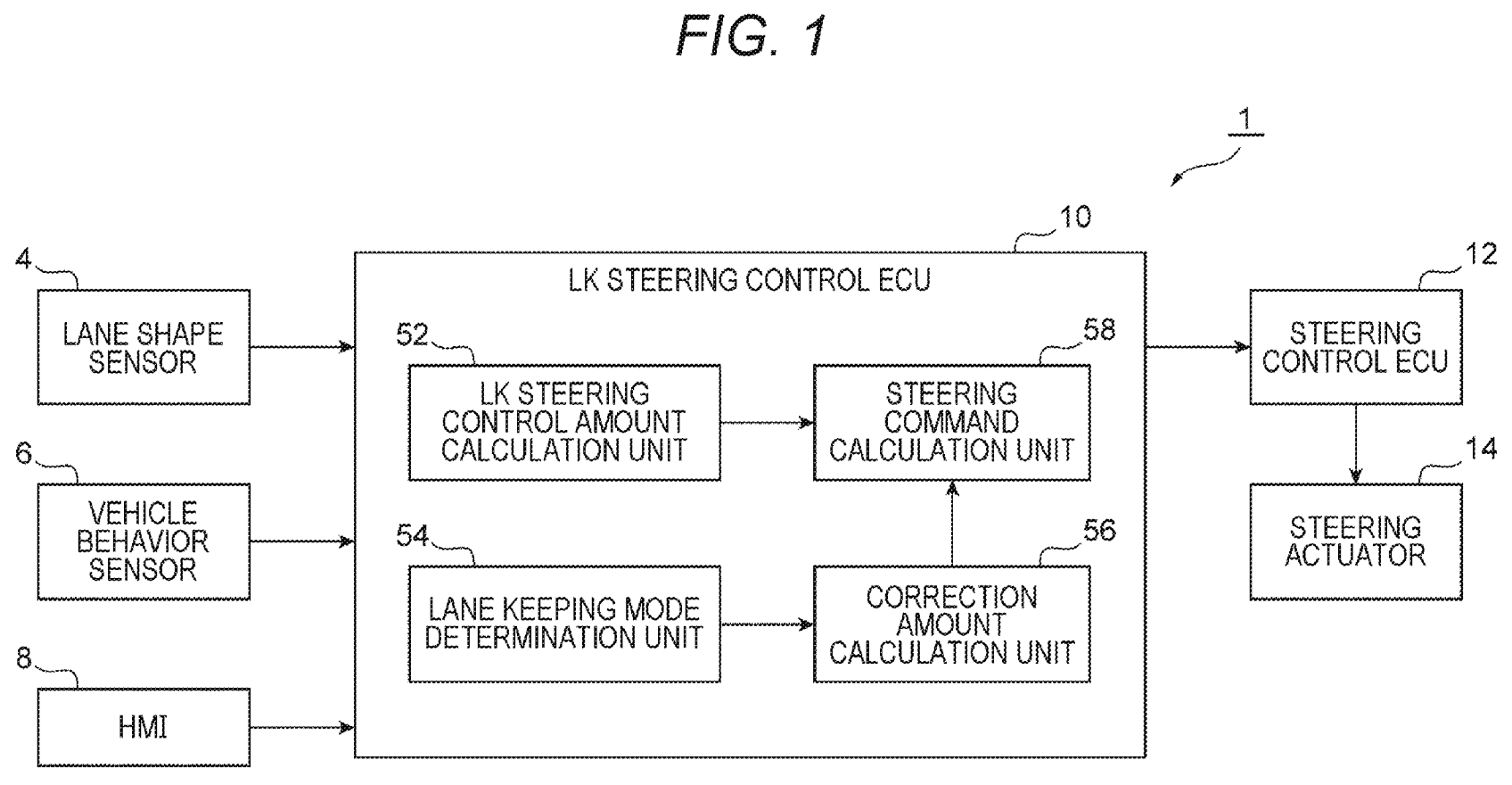

FIG. 1 is a block diagram illustrating a configuration of a vehicle control device according to a first embodiment of the present invention. A vehicle control device 1 is mounted on a vehicle (host vehicle). The vehicle control device 1 performs steering control during LK control, and in particular, performs control that achieves cooperation between the steering control by the LK control and a steering operation by a driver.

The vehicle control device 1 includes an LK steering control ECU 10, a steering control ECU 12, a steering actuator 14, a lane shape sensor 4, a vehicle behavior sensor 6, and an HMI 8.

Figure 2:
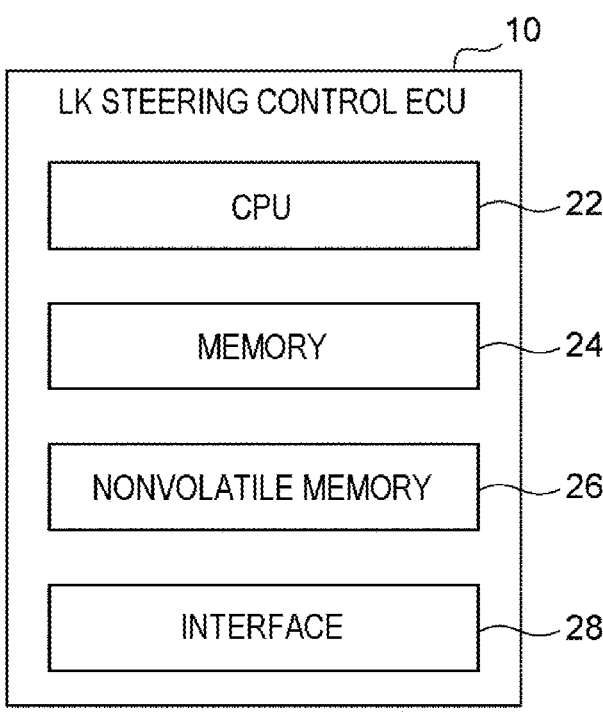
FIG. 2 is a configuration diagram of an LK steering control ECU according to the first embodiment of the present invention.

FIG. 2 is a diagram illustrating a configuration of the LK steering control ECU 10. The ECU is an abbreviation of an electronic control unit, and is an electronic control circuit having a microcomputer as a component. The LK steering control ECU 10 includes a CPU 22, a memory 24, a nonvolatile memory 26, an interface 28, and the like.

The CPU 22 includes at least one processor and/or circuit. The memory 24 includes, for example, a RAM. The non-volatile memory 26 includes, for example, a flash memory and a ROM. The CPU 22 executes a program code (instruction) stored in the nonvolatile memory 26 by using the memory 24 as a work memory. Accordingly, the CPU 22 can execute processing described below. Note that the steering control ECU 12 has a similar configuration.

Note that the LK steering control ECU 10 and the steering control ECU 12 may be integrated into one ECU. Further, one or more ECUs may be added to execute the processing described below.

The lane shape sensor (lane shape detection unit) 4 detects and acquires lane shape information regarding a surrounding region of the host vehicle. The surrounding region of the vehicle includes a front region, a right region, and a left region of the vehicle.

The lane shape information includes division line information regarding a division line (for example, a white line) existing in the surrounding region of the host vehicle.

The division line information includes positions of a plurality of division lines that define lanes, parameters related to the division lines, and the like. The parameters related to the division lines include the curvature of the division line, the lateral position (position in a road width direction) of the vehicle with respect to the division line, the yaw angle of the vehicle with respect to the division line, and the like.

The lane shape sensor 4 may be any type of sensor as long as the lane shape sensor 4 can acquire the division line information.

The vehicle behavior sensor (steering torque detection unit) 6 detects and acquires sensor information, such as information regarding the steering of the driver and the traveling speed of the host vehicle, regarding the vehicle behavior of the host vehicle. The information regarding the steering of the driver includes a steering angle, a steering torque, and the like of the driver who drives the host vehicle.

The switching information by the HMI 8 acquires input information of the control characteristic (described later) selected by the driver. The HMI 8 includes a switch, a touch panel, and the like that can be operated by the driver who drives the host vehicle.

The LK steering control ECU (lane keeping control unit) 10 reads information acquired by the lane shape sensor 4, the vehicle behavior sensor 6, and the HMI 8, calculates a steering command to keep traveling in the lane (perform lane keeping traveling) on the basis of the acquired (detected) lane shape, and outputs the steering command to the steering control ECU 12 (details will be described later).

The steering control ECU (steering control unit) 12 calculates an instruction (operation amount) for controlling the steering of the vehicle in accordance with the steering command received from the LK steering control ECU 10, and outputs the instruction to the steering actuator 14.

The steering actuator 14 is incorporated in a steering mechanism of the vehicle. For example, the steering actuator 14 includes a motor for steering the steering wheels (a left front wheel and a right front wheel) of the vehicle. The steering actuator 14 is configured to control the steering wheels of the vehicle in accordance with the instruction (operation amount) from the steering control ECU 12.

(LK Control by LK Steering Control ECU 10)

As described above, the steering wheel operation state of the driver during the LK control includes two control modes of "a state where the driver operates the steering wheel with intent" and "a state where the driver relies on a system function and does not actively operate the steering wheel". Regarding the point that the steering control that does not cause the sense of discomfort is required in the state of each of the two control modes for the LK control, the following problems will be described again.

In the former state that is "a state where the driver operates the steering wheel", it is usually beneficial that the system informs about delays in the operation of the driver, but it is required that there is no sense of discomfort in the cooperative control corresponding to an informing method. However, since the preference (driving style) of strong control and weak control is divided depending on the driver, a problem (1) that the driver feels the sense of discomfort with one control characteristic occurs.

In the latter state that is "a state where the driver does not actively operate the steering wheel", it is beneficial that a driving load can be reduced by the vehicle keeping the lane by itself and an advanced feeling like automatic driving can be obtained, and the LK control is required to be able to travel without wobbling in the center of the lane. However, in a case where the weak control is performed according to the preference of the driver, there occurs a problem (2) that the steering torque for keeping the lane firmly is insufficient, and the vehicle cannot travel in the center of the lane or wobbles.

The first problem that "the preference of the informing method differs depending on the driver" is handled in such a manner that a plurality of lane keeping modes having different control characteristics are provided in the system, and the driver is allowed to select the preferred lane keeping mode to switch the characteristic (steering gain) of the cooperative control.

When strong control is selected in the lane keeping mode, the steering gain is increased to increase a torque assist amount, so that the lane can be kept with a small operation of the driver. Therefore, the driver can obtain a steering feeling that is system-centric. On the other hand, when the weak control is selected in the lane keeping mode, the steering gain is reduced to reduce the torque assist amount, so that a large operation of the driver is required to keep the lane, and the driver can obtain a steering feeling that is driver-centric. As described above, the system includes the lane keeping mode in which the desired steering feeling can be achieved, and the driver selects the preference, whereby this problem can be solved.

The second problem that "when the steering control is weakened, the lane keeping performance is deteriorated" is handled in such manner that as the steering operation of the driver decreases, any lane keeping mode shifts the setting value of the steering gain to a default (for example, one time) and shifts to a control characteristic that enhances the lane tracing performance. According to this method, regardless of which lane keeping mode the driver selects, when the driver operation amount is small, such as when entrusting the steering wheel operation to the system, a torque assist amount is set to a large torque assist amount suitable for lane keeping to achieve stable lane tracing performance, so that this problem can be solved.

Note that, in a region where the driver steering amount is small, a difference in steering gain in the plurality of lane keeping modes is set to be small, so that an influence on a steering torque sensor error (steering torque sensor noise) during traveling can be suppressed, and a step in the control characteristic can be reduced.

By taking these two measures, it is possible to achieve both lane tracing keeping during LK control and the preferred steering control characteristic of the driver.

In order to execute the above measures, as illustrated in FIG. 1, the LK steering control ECU 10 includes, as functional blocks, an LK steering control amount calculation unit 52, a lane keeping mode determination unit 54, a correction amount calculation unit 56, and a steering command calculation unit 58.

The LK control by the LK steering control ECU 10 and the operation of each functional block of the LK steering control ECU 10 will be described in detail with reference to the flowchart of FIG. 3.

The present embodiment relates to the cooperation between the steering operation of the driver and the steering control during traveling by the LK control, and is an example illustrating that the driver can select his or her preferred steering control characteristic to eliminate the sense of discomfort.

Figure 3:
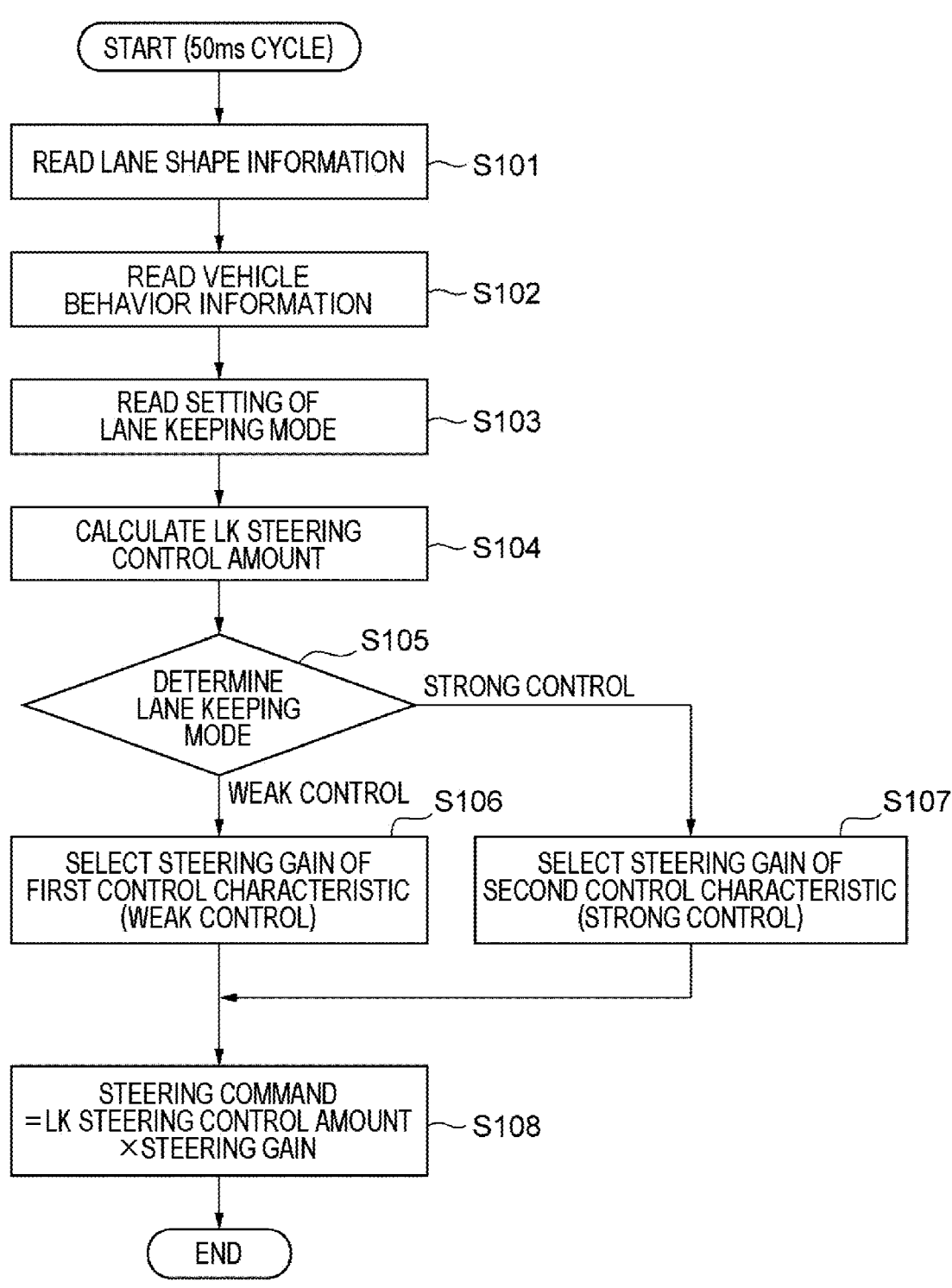
FIG. 3 is a flowchart of the LK steering control ECU according to the first embodiment of the present invention.

FIG. 3 is a flowchart of the LK steering control ECU 10. The present embodiment is processing performed once in a certain period of time (for example, 50 ms), and the flow thereof will be described below.

In step S101, a general lane shape detection result (the curvature, yaw angle, lateral position, or the like of a white line) used in the LK control is read (from the lane shape sensor 4).

In step S102, sensor information (vehicle speed, steering angle, steering torque, or the like) related to the vehicle behavior used in the LK control is read (from the vehicle behavior sensor 6).

Figure 4:
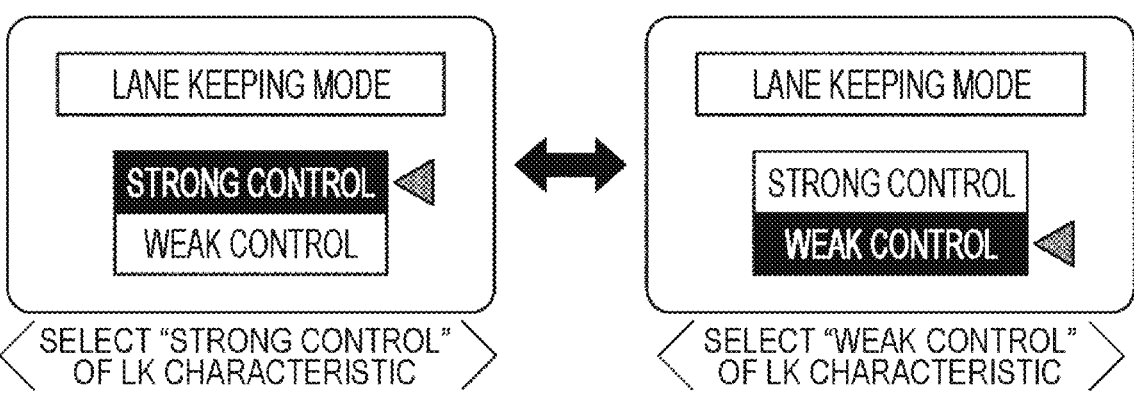
FIG. 4 is a setting example of an operation screen according to the first embodiment of the present invention.

In step S103, in selection processing of the lane keeping mode according to the present embodiment, the lane keeping mode selected by the driver with a switch, a touch panel, or the like is read (from the HMI 8). An image in which selection is made on the display of a meter screen by the switch is illustrated in FIG. 4.

In step S104 (LK steering control amount calculation unit 52), the LK steering control amount necessary for performing the lane keeping traveling on the system is calculated from the information read in steps S101 and S102.

In step S105 (lane keeping mode determination unit 54), the lane keeping mode selected according to the preference of the driver is determined from the information read in step S103.

In a case where the lane keeping mode is "weak control", the process proceeds to step S106, and in a case where the lane keeping mode is "strong control", the process proceeds to step S107.

In step S106 (correction amount calculation unit 56), in order to achieve the weak control mode (driver-centric), a steering gain for weak control is calculated according to a preset first control characteristic. The first control characteristic is a steering gain map, and the steering gain is calculated by using a torque sensor value (absolute value) obtained by detecting the steering operation amount of the driver from the steering gain map, and the process proceeds to step S108. An image diagram of the steering gain map is illustrated in FIG. 5.

In step S107 (correction amount calculation unit 56), in order to achieve the strong control mode (system-centric), a steering gain for strong control is calculated according to a preset second control characteristic. In the second control characteristic, a setting value of the steering gain is increased with respect to the first control characteristic to clarify a difference in the control characteristic. The steering gain is calculated by using a torque sensor value (absolute value) obtained by detecting the steering operation amount of the driver from the steering gain map, and the process proceeds to step S108. An image diagram of the steering gain map is illustrated in FIG. 5.

Note that the steering gain map is a map defining a relationship between a torque sensor value (absolute value) and a steering gain for using, as an input, the torque sensor value (absolute value) obtained by detecting the steering operation amount of the driver and outputting the steering gain as a correction amount for correcting the LK steering control amount for reflection in the steering command.

Figure 5:
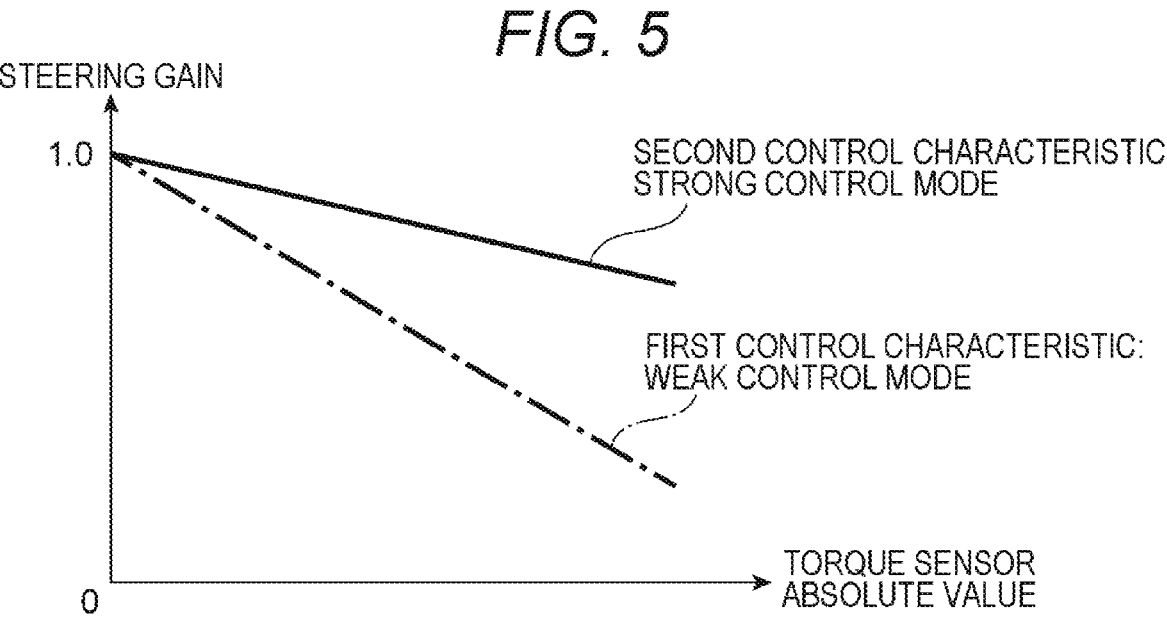
FIG. 5 is a steering gain map illustrating a steering gain according to the first embodiment of the present invention.

That is, the correction amount calculation unit 56 of the LK steering control ECU 10 sets in advance the first control characteristic (weak control mode) and the second control characteristic (strong control mode) which can be selected as the control characteristic of the steering gain map according to the preference of the driver (see FIG. 5). The correction amount calculation unit 56 selects the first control characteristic (weak control mode) or the second control characteristic (strong control mode) on the basis of the lane keeping mode (that is, the switching information input in advance from the HMI 8 according to the preference of the driver) determined in step S105 (lane keeping mode determination unit 54). Then, the correction amount calculation unit 56 calculates the steering gain as the correction amount by using the torque sensor value (in other words, corresponding to the torque sensor value) according to the selected control characteristic.

In the example illustrated in FIG. 5, the first and second control characteristics of the steering gain map are set such that the steering gain continuously decreases from the default (one time) as the torque sensor value increases. In addition, when viewed with the same torque sensor value, the steering gain of the second control characteristic is set to be larger than the steering gain of the first control characteristic (in other words, the steering gain of the first control characteristic is smaller than the steering gain of the second control characteristic). In addition, a difference between the steering gains of the first and second control characteristics (corresponding to a characteristic difference) is set to increase (change) as the torque sensor value increases.

However, the setting example of the steering gain map is not limited to the example illustrated in FIG. 5 as long as the setting value of the steering gain of the second control characteristic (strong control mode) is larger than that of the first control characteristic (weak control mode), the first control characteristic is set with the input of the driver as a main factor, and the second control characteristic is set with the input of the system (the LK steering control ECU 10) as a main factor.

For example, the setting value of the steering gain of the first control characteristic when the torque sensor value is 0 (when there is no steering intervention) may be less than default (one time).

Figures 6, 7:
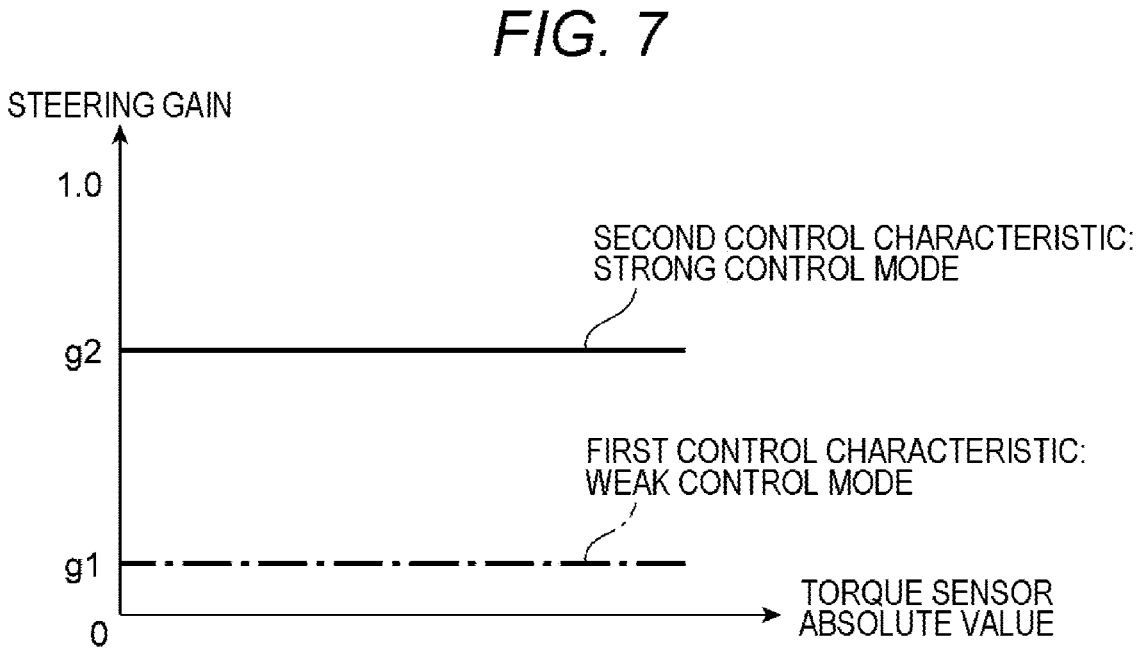
FIG. 6 is another example of the steering gain map illustrating the steering gain according to the first embodiment of the present invention.
FIG. 7 is still another example of the steering gain map illustrating the steering gain according to the first embodiment of the present invention.

In addition, as illustrated in FIG. 6, the difference between the steering gains of the first and second control characteristics (corresponding to the characteristic difference) may be constant regardless of the height of the torque sensor value.

In addition, as illustrated in FIG. 7, the steering gains of the first and second control characteristics may be constant regardless of the height of the torque sensor value (steering gain g1 of first control characteristic<steering gain g2 of second control characteristic). In addition, although not illustrated, the steering gain of only one of the first and second control characteristics may be constant.

In addition, as illustrated in FIGS. 5, 6, and 7, the steering gains of the first and second control characteristics are desirably continuous (have continuity) with respect to the torque sensor value (input steering torque), but may not be continuous.

In step S108 (steering command calculation unit 58), a result obtained by multiplying the LK steering control amount obtained in step S104 by the steering gain according to the lane keeping mode obtained in step S106 or step S107 (in other words, a result obtained by correcting the LK steering control amount on the basis of the steering gain corresponding to the lane keeping mode) is output to the steering control ECU 12 as the steering command.

As described above, in the first embodiment, the plurality of lane keeping modes having different control characteristics are provided, the driver selects a preferred lane keeping mode, and the steering gain is switched (to the first or second control characteristic) according to the selected lane keeping mode, whereby the preferred steering control of the driver can be achieved.

Second Embodiment

Figure 8:
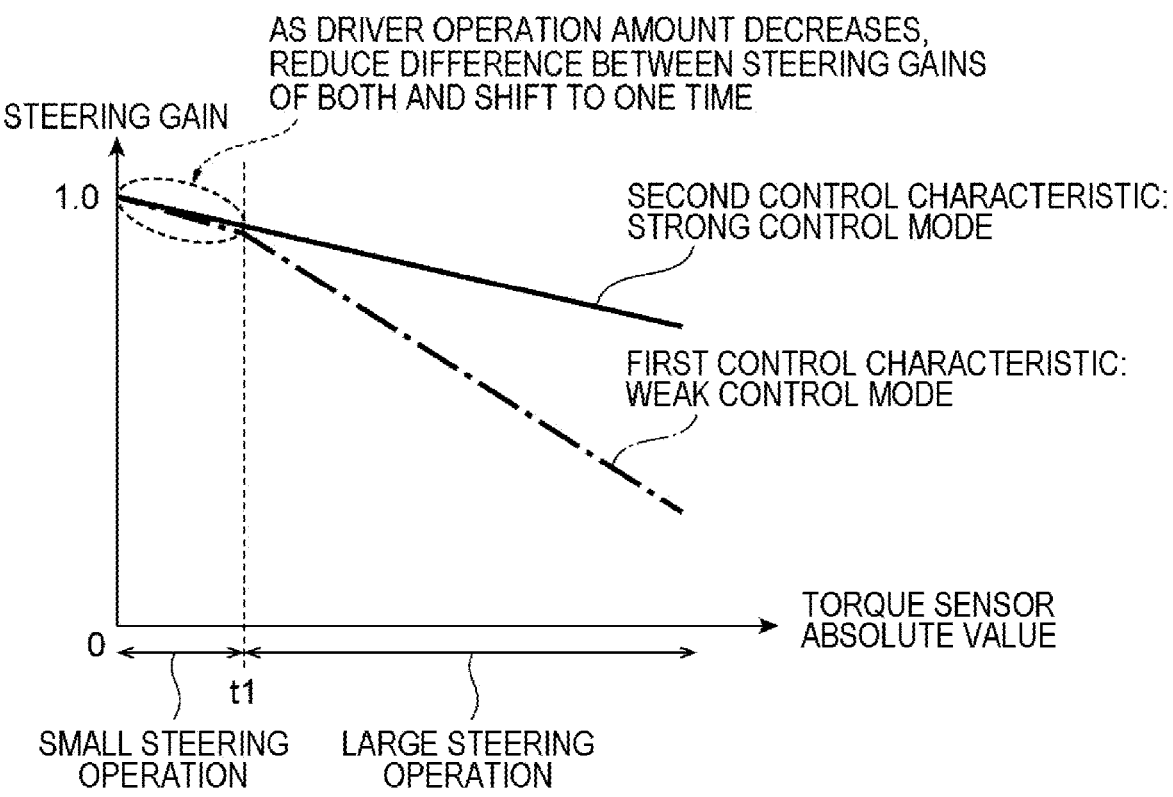
FIG. 8 is a steering gain map illustrating a steering gain according to a second embodiment of the present invention.

In a second embodiment, effects of other settings on the first and second control characteristics of the first embodiment will be described. FIG. 8 is an image diagram of a steering gain map of the second embodiment.

As illustrated in FIG. 8, in a case where the torque sensor value is lower than a predetermined value (t1), the first and second control characteristics are set to be equivalent characteristics (in other words, to be characterized equivalently) by reducing a difference between the steering gains of both and shifting the steering gains to the default (one time). Specifically, in a case where the torque sensor value is lower than the predetermined value (t1), an equivalent steering gain is set to be output. On the other hand, in a case where the torque sensor value is higher than the predetermined value (t1), the characteristics are set to be different from each other depending on the height of the torque sensor value. Specifically, in a case where the torque sensor value is higher than the predetermined value (t1), a different steering gain is set to be output. That is, here, in a case where the torque sensor value is higher than the predetermined value (t1), the first and second control characteristics are set such that the difference between the steering gains of the first and second control characteristics (corresponding to the characteristic difference) increases (changes) as the torque sensor value increases.

As described above, the first and control second characteristics are set on the basis of steering intervention from the driver, the first control characteristic is set with the input of the driver as a main factor, and the second control characteristic is set with the input of the system (the LK steering control ECU 10) as a main factor. Thus, in a case where the torque sensor value is higher than the predetermined value (t1), the first control characteristic is set to output a steering gain lower than the second control characteristic.

Note that also in the example illustrated in FIG. 8, the steering gains of the first and second control characteristics are set to be continuous (have continuity) with respect to the torque sensor value (input steering torque), but may not be continuous (for example, before or after the predetermined value (t1)).

In the second embodiment, in the first and second control characteristics, the steering gain is shifted to the default (one time) as the steering operation amount (=torque sensor value) of the driver decreases, and thus, in a region where the driver steering amount is small (a region lower than the predetermined value (t1)), the difference between the steering gains of both is reduced (for example, the steering gains of both are matched), and the steering gain approaches the default (one time), so that it is possible to suppress the influence on the steering torque sensor noise during traveling, and the control characteristic focusing on the lane tracing performance can be achieved without a step. Note that even in a case where three or more control characteristics of the lane keeping mode are set, a similar effect can be obtained by adding this means.

Third Embodiment

In a third embodiment, effects of other settings on the first and second control characteristics of the first embodiment will be described. FIG. 9 is an image diagram of a steering gain map of the third embodiment.

As illustrated in FIG. 9, similarly to the second embodiment, in a case where the torque sensor value is lower than the predetermined value (t1), the first and second control characteristics are set so as to be equivalent characteristics (in other words, to be characterized equivalently) by reducing the difference between the steering gains of both and shifting the steering gains to the default (one time). On the other hand, in a case where the torque sensor value is higher than the predetermined value (t1), the characteristics are set to be different from each other depending on the height of the torque sensor value. That is, here, in a case where the torque sensor value is higher than the predetermined value (t1), the first and second control characteristics are set such that the difference between the steering gains of the first and second control characteristics (corresponding to the characteristic difference) increases (changes) as the torque sensor value increases.

In addition, the first control characteristic is set such that the characteristic of the steering gain output in a case where the torque sensor value is lower than a predetermined value (t2: t2>t1) is different from the characteristic of the steering gain output in a case where the torque sensor value is higher than the predetermined value (t2). Here, the characteristic of the steering gain is a gradient or a degree of change of the steering gain with respect to the torque sensor value (input steering torque value). More specifically, the first control characteristic is set such that the gradient (decreasing gradient) of the steering gain output in a case where the torque sensor value is lower than the predetermined value (t2) is smaller than the gradient (decreasing gradient) of the steering gain output in a case where the torque sensor value is higher than the predetermined value (t2).

Note that, in the present embodiment, an example is illustrated in which in the first control characteristic, the characteristic of the steering gain to be output is changed before and after the predetermined value (t1, t2). However, also in the second control characteristic, the characteristic of the steering gain to be output may be similarly changed.

Note that also in the example illustrated in FIG. 9, the steering gains of the first and second control characteristics are set to be continuous (have continuity) with respect to the torque sensor value (input steering torque), but may not be continuous (for example, before or after the predetermined value (t1, t2)).

In the third embodiment, in the first and second control characteristics, by setting the control characteristics (steering gains) at different inclinations before and after the predetermined value (t1, t2), the lane tracing performance can be made equivalent while further expanding the range of the characteristic of the LK control. In addition, it is possible to make it difficult to feel a step even with a larger difference in steering gain. In addition, the above means is added to the first control characteristic set with the input of the driver as a main factor, so that in the LK control that is driver-centric, in a region where the driver steering amount is small (=a region where the steering gain is large) (that is, a region where the influence of the steering torque sensor noise is large), the change (gradient) in the steering gain with respect to the driver operation is made gentle, and in a region where the driver steering amount is large (=a region where the steering gain is small) (that is, a region where the steering intervention of the driver is large), the change (gradient) in the steering gain with respect to the driver operation is made large, whereby optimum steering feeling can be achieved.

Fourth Embodiment

In a fourth embodiment, effects of other settings on the first and second control characteristics of the first embodiment will be described. FIG. 10 is an image diagram of a steering gain map of the fourth embodiment.

As illustrated in FIG. 10, in each of the first and second control characteristics, in a case where the torque sensor value is higher than a reference value (t3: t3>t1, t2), the characteristic is set to be constant (specifically, output a constant steering gain) regardless of the height of the torque sensor value.

Note that also in the example illustrated in FIG. 10, the steering gains of the first and second control characteristics are set to be continuous (have continuity) with respect to the torque sensor value (input steering torque), but may not be continuous (for example, before or after the reference value (t3)).

In the fourth embodiment, the first and second control characteristics are set such that the steering gain is constant in a section where the steering torque is large. Since the steering control amount of the system is determined by the steering gain×the deviation amount from the center of the lane, the steering gain is made constant, so that the deviation from the center of the lane can be easily grasped by the steering control amount, and thus it is possible to appropriately transmit the traveling situation to the driver.

[Effects of First to Fourth Embodiments]

As described above, the vehicle control device 1 according to the present embodiment includes: a lane shape detection unit (lane shape sensor 4) that detects a lane shape around a vehicle; a steering torque detection unit (vehicle behavior sensor 6) that detects a steering torque (a torque sensor value of a steering torque sensor) of a driver who drives the vehicle; a lane keeping control unit (LK steering control ECU 10) that calculates a steering command for keeping traveling in a lane on the basis of the detected lane shape; and a steering control unit (steering control ECU 12) that controls steering of the vehicle on the basis of the steering command from the lane keeping control unit (LK steering control ECU 10), and the lane keeping control unit (LK steering control ECU 10) has a plurality of control characteristics including at least a first control characteristic and a second control characteristic selectable according to a preference of the driver, selects the first or second control characteristic on the basis of switching information input in advance (from HMI 8) according to the preference of the driver, calculates a steering control amount necessary for keeping traveling in the lane, and calculates the steering command after correcting the calculated steering control amount on the basis of (an steering gain calculated by) the selected control characteristic.

In addition, the first and second control characteristics are set on the basis of steering intervention from the driver detected by the steering torque detection unit (vehicle behavior sensor 6), the first control characteristic is set with the input of the driver as a main factor, and the second control characteristic is set with the input of the lane keeping control unit (LK steering control ECU 10) as a main factor (that is, a value output from the first control characteristic is lower than a value output from the second control characteristic).

According to the present embodiment, it is possible to provide the vehicle control device 1 that achieves the preferred steering control characteristic of the driver while keeping the lane tracing during the LK control.

That is, by allowing the driver to select the strength of the steering control in the lane keeping, it is possible to provide the vehicle control device 1 that achieves the preferred steering feeling and enables both the steering feeling and the lane keeping performance without affecting the lane tracing performance regardless of which control characteristic is selected.

Note that the present invention is not limited to the above-described embodiments, and includes various modifications. For example, the above-described embodiments have been described in detail for easy understanding of the present invention, and are not necessarily limited to those having all the described configurations.

In addition, some or all of the above-described configurations, functions, processing units, processing means, and the like may be achieved by hardware, for example, by designing with an integrated circuit. In addition, each of the above-described configurations, functions, and the like may be achieved by software by a processor interpreting and executing a program for achieving each function. Information such as a program, a table, and a file for achieving each function can be stored in a storage device such as a memory, a hard disk, and a solid state drive (SSD), or a recording medium such as an IC card, an SD card, and a DVD.

In addition, the control lines and the information lines indicate what is considered to be necessary for the description, and do not necessarily indicate all the control lines and the information lines on the product. In practice, it may be considered that almost all the configurations are connected to each other.

REFERENCE SIGNS LIST 1 vehicle control device
4 lane shape sensor (lane shape detection unit)
6 vehicle behavior sensor (steering torque detection unit)
8 HMI
10 LK steering control ECU (lane keeping control unit)
12 steering control ECU (steering control unit)
14 steering actuator
52 LK steering control amount calculation unit

54 lane keeping mode determination unit

56 correction amount calculation unit

58 steering command calculation unit

The invention claimed is:

1. A vehicle control device comprising:

a lane shape detection unit that detects a lane shape around a vehicle;

a steering torque detection unit that detects a steering torque of a driver who drives the vehicle;

a lane keeping control unit that calculates a steering command for keeping traveling in a lane on a basis of the detected lane shape; and a steering control unit that controls steering of the vehicle on a basis of the steering command from the lane keeping control unit, wherein the lane keeping control unit has a plurality of control characteristics including at least a first control characteristic and a second control characteristic selectable according to a preference of the driver, selects the first or second control characteristic on a basis of switching information input according to the preference of the driver, calculates a steering control amount necessary for keeping traveling in the lane, and calculates the steering command after correcting the calculated steering control amount on a basis of the selected control characteristic; and wherein the first and second control characteristics are set to be equivalent characteristics in a case where an input steering torque value is lower than a predetermined value, and are set to be characteristics different from each other depending on the input steering torque value in a case where the input steering torque value is higher than the predetermined value.

2. The vehicle control device according to claim 1, wherein the first and second control characteristics are set such that, in a case where the input steering torque value is higher than the predetermined value, a characteristic difference increases as the input steering torque value increases.

3. The vehicle control device according to claim 1, wherein the first and second control characteristics each have a constant characteristic regardless of the input steering torque value in a case where the input steering torque value is higher than a reference value larger than the predetermined value.

4. The vehicle control device according to claim 1, wherein the first and second control characteristics are set on a basis of steering intervention from the driver detected by the steering torque detection unit, the first control characteristic is set with an input of the driver as a first main factor, and the second control characteristic is set with an input of the lane keeping control unit as a second main factor.

5. The vehicle control device according to claim 4, wherein the first and second control characteristics are set to be equivalent characteristics in a case where an input steering torque value is lower than a predetermined value, and are set to be characteristics different from each other depending on a height of the input steering torque value in a case where the input steering torque value is higher than the predetermined value, and in a case where the input steering torque value is higher than the predetermined value, the first control characteristic outputs a value lower than the second control characteristic.

6. The vehicle control device according to claim 4, wherein the first and second control characteristics are set to be equivalent characteristics in a case where an input steering torque value is lower than a predetermined value, and are set to be characteristics different from each other depending on a height of the input steering torque value in a case where the input steering torque value is higher than the predetermined value, and in the first control characteristic, a characteristic of a steering gain output in a case where the input steering torque value is lower than another predetermined value different from the predetermined value is different from a characteristic of a steering gain output in a case where the input steering torque value is higher than the another predetermined value.

7. The vehicle control device according to claim 6, wherein in the first control characteristic, a gradient of a steering gain, which is output in a case where the input steering torque value is lower than the another predetermined value, with respect to the steering torque is smaller than a gradient of a steering gain, which is output in a case where the input steering torque value is higher than the another predetermined value, with respect to the steering torque.

8. The vehicle control device according to claim 1, wherein the first and second control characteristics each have continuity with respect to an input steering torque.

* * * * *